US008776247B2

(12) United States Patent
Peeters et al.

(10) Patent No.: US 8,776,247 B2
(45) Date of Patent: Jul. 8, 2014

(54) VERIFICATION OF PROCESS INTEGRITY

(75) Inventors: Michael Peeters, Tourines-la-Grosse (BE); Claude Debast, Lembeek (BE); Bruno Motte, Benouville (FR); Tim Froidcoeur, Hoeilaart (BE)

(73) Assignee: Telit Automotive Solutions NV, Leuven (BE)

( * ) Notice: Subject to any disclaimer, the term of this patent is extended or adjusted under 35 U.S.C. 154(b) by 402 days.

(21) Appl. No.: 13/059,387

(22) PCT Filed: Aug. 21, 2009

(86) PCT No.: PCT/IB2009/053697
§ 371 (c)(1), (2), (4) Date: May 3, 2011

(87) PCT Pub. No.: WO2010/020968
PCT Pub. Date: Feb. 25, 2010

(65) Prior Publication Data

US 2011/0203003 A1 Aug. 18, 2011

(30) Foreign Application Priority Data

Aug. 22, 2008 (EP) .................................... 08105106

(51) Int. Cl.
*H04L 29/06* (2006.01)

(52) U.S. Cl.
USPC ............................................ 726/26; 713/168

(58) Field of Classification Search
USPC ............................................ 726/26; 713/168
See application file for complete search history.

(56) References Cited

U.S. PATENT DOCUMENTS

| | | | | |
|---|---|---|---|---|
| 7,005,982 | B1 * | 2/2006 | Frank | 340/539.26 |
| 7,290,289 | B2 | 10/2007 | Janke et al. | |
| 2001/0002815 | A1 * | 6/2001 | Seto | 340/426 |
| 2004/0003245 | A1 * | 1/2004 | Dabbish et al. | 713/168 |
| 2004/0101142 | A1 | 5/2004 | Nasypny | |
| 2005/0035208 | A1 * | 2/2005 | Elliot et al. | 235/472.01 |
| 2006/0161773 | A1 * | 7/2006 | Okazaki et al. | 713/168 |
| 2008/0270793 | A1 * | 10/2008 | Nowottnick | 713/168 |
| 2009/0165149 | A1 | 6/2009 | Gonzalvo et al. | |
| 2010/0241857 | A1 * | 9/2010 | Okude et al. | 713/168 |

FOREIGN PATENT DOCUMENTS

| | | | |
|---|---|---|---|
| CN | 1528068 | A | 9/2004 |
| WO | 03/010638 | A | 2/2003 |
| WO | 2007/068706 | A | 6/2007 |

OTHER PUBLICATIONS

Chinese Office Action in corresponding CN Application No. 200980132669.3, dated Apr. 1, 2013.

* cited by examiner

*Primary Examiner* — Chau Le
(74) *Attorney, Agent, or Firm* — Pearl Cohen Zedek Latzer Baratz LLP

(57) ABSTRACT

A system implements a secure transaction of data between a server and a remote device. The remote device comprises: processing means adapted to process input data according to a security process; data storage means adapted to store verification information derived from the input data according to an encryption algorithm; and communication means for communicating the input data which has been processed by the security process to the server. The server is adapted to transmit a verification request to the remote device, and to verify the integrity of the security process based on verification information received from the communication means of the remote device in response to the verification request.

18 Claims, 5 Drawing Sheets

VERIFICATION OF PROCESS INTEGRITY

CROSS-REFERENCE TO RELATED APPLICATIONS

This application is a National Phase Application of PCT International Application No. PCT/IB2009/053697, International Filing Date Aug. 21, 2009, which claims priority from European Patent Application No. 08105106.2, filed Aug. 22, 2008, both of which are hereby incorporated by reference in their entirety.

This invention relates to the verification of process integrity, and in particular the verification of the integrity of a process undertaken in a remote device.

It is known for a remote device to comprise communication means adapted to communicate with a server from which the device is remotely located. Where such a device undertakes one or more processes, it may be desirable to verify the integrity of data from the process or processes to the server.

A field of application where the integrity of data from a remote device may need to be verified is the field of location based services, wherein the genuine location of a user may need to be known or tracked for example. Location based services rely on the integrated use of telecommunications and informatics (otherwise known as "telematics").

The use of telematics with vehicles is currently a particular area of interest. For example, vehicle telematics systems may be used for a number of purposes, including collecting road tolls, managing road usage (intelligent transportation systems), tracking fleet vehicle locations, recovering stolen vehicles, providing automatic collision notification, location-driven driver information services and in-vehicle early warning notification alert systems (car accident prevention).

Road tolling is considered as the first likely large volume market for vehicle telematics. Telematics is now beginning to enter the consumer car environment as a multimedia service box for closed services. These markets are still low in volume and are considered as niche markets. The European Union, with the Netherlands as a leading country, has the intention to introduce road tolling as an obligatory function for every car from 2012 onwards.

So far, road tolling has been used for highway billing, truck billing and billing for driving a car in a certain area (e.g. London city). Toll plazas at which vehicles must stop are generally used, or else short range communications systems allow automatic debiting of a fund when a vehicle passes.

Future road tolling functions may impose the requirement of less (or no) infrastructure and may also impose tolling for every mile driven. It is envisaged that the vehicle will have a GPS system on board and a GSM (mobile telephony network) connection to enable information to be relayed to a centralized road tolling system.

The charging system in an automated road toll system can be based on distance travelled, the time, location and vehicle characteristics. The road tolling may apply to all vehicles or it may exclude certain classes of vehicle (for example with foreign number plates).

There is a need to increase the security of this type of system and to make fraudulent use of the system as difficult as possible.

Modern road pricing systems based upon GPS and GSM make use of the reception of the GPS satellite signals to determine location, speed, etc. If the GNSS signals can be tampered, a user may be able to pretend to have driven on other (cheaper) roads. GPS test transmitters could conceivably be used for this purpose, with the test signals received by the vehicle's On Board Unit (OBU).

An OBU collects positioning information from a GNSS front-end, and performs different kinds of operations depending on the type of client application running inside, before transmitting the result(s) of the operations to a remote server.

Privacy, security and cost are important factors which must be carefully analyzed when designing such an OBU. Furthermore, signal tampering can occur along the signal decoding path of the receiver, probing and inserting fake information.

This invention is therefore concerned with the problem of proving to a server the integrity of a process in a remote device has not been compromised, and in particular that the data output of the process has been correctly derived from the submitted input.

According to the invention, there is provided a system comprising a server and a remote device and adapted to implement a secure transaction of data between the server and remote device, wherein the remote device comprises: processing means adapted to process input data according to a security process; data storage means adapted to store verification information derived from the input data according to an encryption algorithm; and communication means for communicating the input data which has been processed by the security process to the server, and wherein the server is adapted to transmit a verification request to the remote device, and to verify the integrity of the security process based on verification information received from the communication means of the remote device in response to the verification request.

The invention provides a counter measure for detecting the counterfeiting of, tampering with, one or more processes in a remote device. It therefore enables the integrity of a process within a remote device to be verified. It also enables a check to be made that the output of a process has been correctly derived from a submitted input.

Embodiments may execute a verification process in the server as a mirror to the remote process to check whether or not the results match and assess if there is evidence of tampering in the processing environment of the remote device.

In an alternative embodiment, the security process is adapted to process input data (for example, by using a cryptographically secure one-way hash function) such that the processed data does not disclose information related to the content of the input data. In this way, privacy of the input data can be maintained.

According to another aspect of the invention, there is provided a method of implementing a secure transaction of data between a server and a remote device, the method comprising, processing input data in the remote device according to a security process;

storing verification information derived from the input data according to an encryption algorithm;

communicating the processed data to the server;

transmitting a verification request from the server to the remote device;

communicating verification information to the server in response to the verification request; and verifying at the server the integrity of the security process based on verification information communicated to the server.

Examples of the invention will now be described in detail with reference to the accompanying drawings, in which:

FIG. 1 shows a road toll system to which the invention can be applied.

Figure 1:
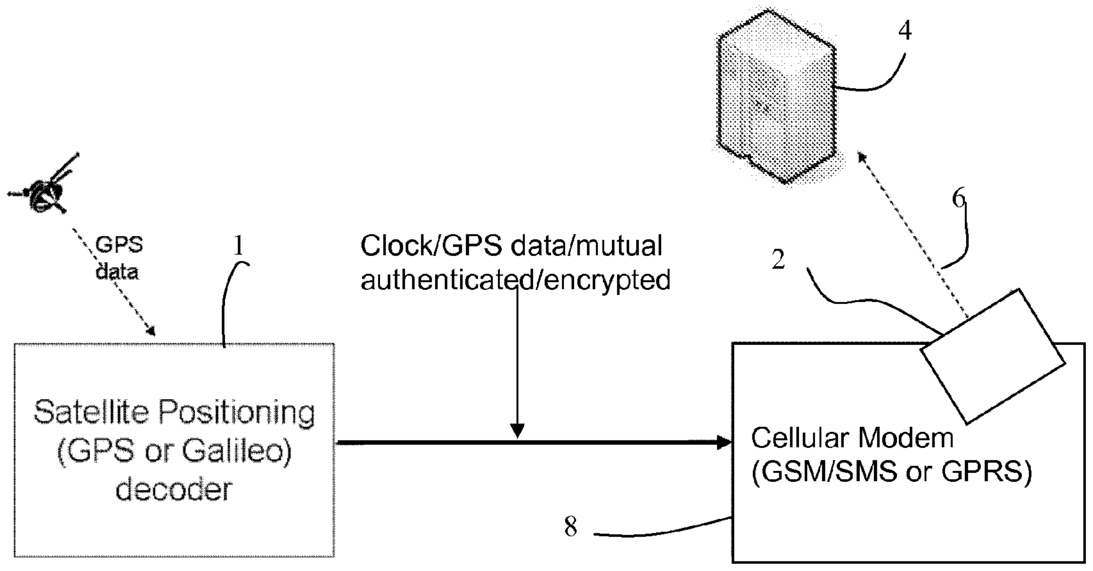
FIG. 1 shows a first example of road toll system which can use the system of the invention.

GPS data is captured by the GPS receiver 1. This data is decoded to position data (longitude-latitude). The position data together with timing (clock) data is stored in memory 2 in the form of a Smart card. Periodically a batch of stored data is sent to the back-end road tolling server 4, as shown by the batch download 6. This can be ideally done by a GSM function (General Packet Radio Service "GPRS" or Third Generation mobile telephony "3G") using a cellular modem 8. The back-end server is able to reconstruct out of this data the journeys that are driven.

The server 4 also contains a database of road prices which were valid at a certain time. Finally the total price is computed and the driver gets an invoice (e.g. monthly).

In prevent the data being tampered by the user, data is exchanged in cryptographic way (e.g. DES or 3DES) between the GPS decoder and the tamper resistant environment of the memory 2. A Smart card provides a good tamper proof environment.

If the total income from road tolling is to be approximately the same as the actual tax income from existing taxation, the average cost/km is very small. Each journey is thus very small, which means a continuous on-line transaction scheme may not be desirable, hence the desire for a batch download.

This type of transaction scheme is much in line with current known electronic purse schemes used by the banking world.

Privacy protection in such a system has previously been difficult. The system stores and transmits combinations of GSM, GPS and personal identity data to a central server system. Maintaining privacy protection means the security needs to be at a total end-to-end system level, including the server infrastructure.

This invention provides additional verification measures to secure transactions between a server and a remote device. Such transactions can be generally described as illustrated in FIG. 2.

Figure 2:
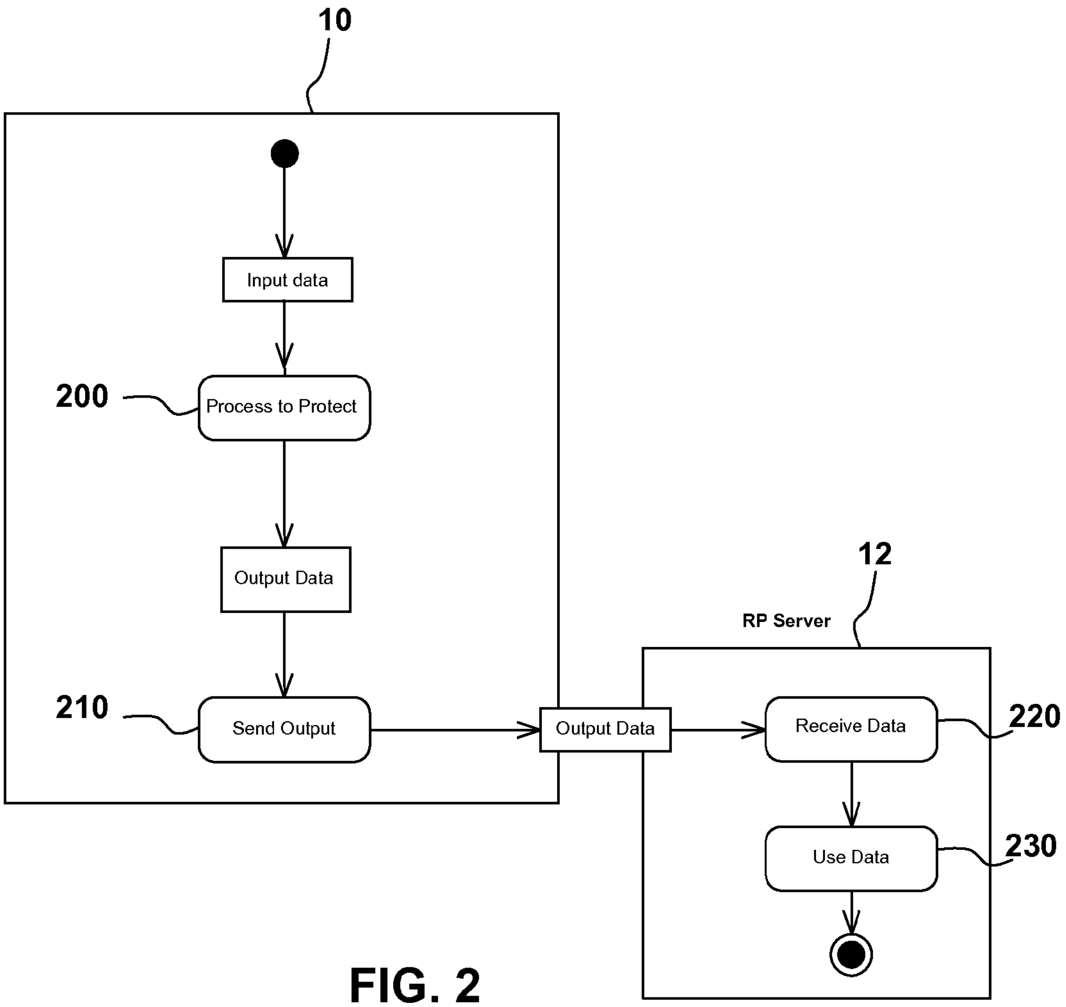
FIG. 2 is a flow diagram illustrating the phases of a general data transaction between a host controller of a remotely located device and a server 12.

FIG. 2 is a flow diagram illustrating the phases of a general data transaction between a host controller of a remotely located device 10 and a server 12.

Firstly, in step 200 input data is processed for protection using a suitable encryption algorithm or the like. The processed data is then output from encryption process and transmitted from the remote device 10 to the server 12 in step 210. The transmitted data is received at the server 12 in step 220 and then use by the server 12 as required in step 230.

The invention proposes to secure such a general transaction between a server and a remote device in two phases, as will now be described with reference to FIG. 3.

Figure 3:
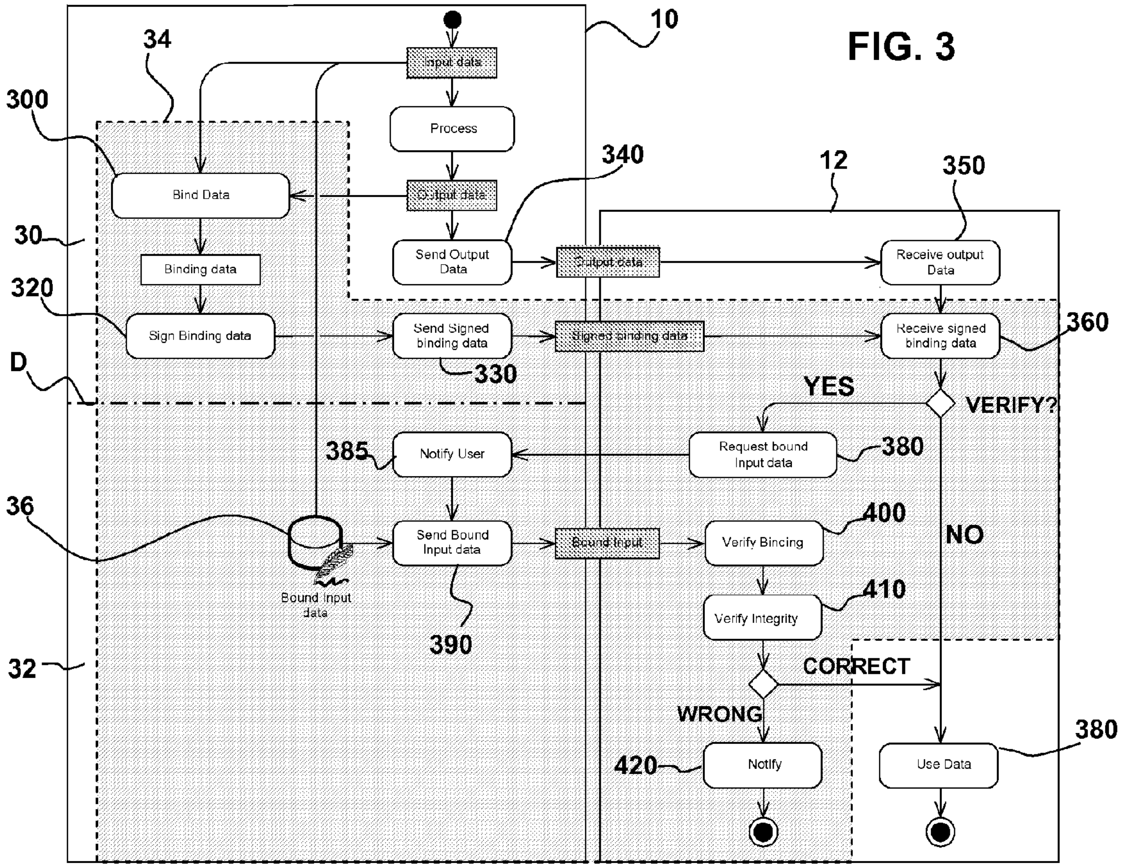
FIG. 3 is a flow diagram illustrating a general transaction between a server and a remote device according to an embodiment of the invention.

Referring to FIG. 3, an embodiment of the invention is carried out in two phases: a commit phase 30 and a verification phase 32, wherein the distinction between these two phases is illustrated by the dashed-dotted line labelled "D". Further, for ease of understanding, the additional method steps when compared to the method of FIG. 2 are identified by a hatched region 34.

The commit phase 30 is the general transaction itself, completed with two sub-steps. In the first sub-step, the input data submitted to the process to protect and the generated output data are bound together in a cryptographic manner in method step 310. Step 310, thus generates binding data. This binding data does not disclose any information related to the content of the input data or output data. In the second sub-step of the commit phase 30, the binding data is signed in step 320 using a cryptographic algorithm, and the resulting signed binding data is transmitted in step 330 to the remotely located server 12 along with the output data (step 340).

The bound input data is not transmitted to the server but instead kept in a database 36 (which is local to the remote device 10) for further retrieval during the verification phase 32. It will therefore be understood that the bound input data stored in the database 36 is trusted information which can be used for verification purposes, or in other words, verification information. By way of example, the bound input data may be input data encrypted according to an encryption algorithm using a trusted/secure processer.

The verification phase 32 is initiated by the server 12. Upon reception of the output data and signed binding data from the remote host controller in steps 350 and 360, the server either accepts the output data and proceeds forward to step 370 normally, or requires the verification of the integrity of the process that was carried out by the remote device 10. This decision may be undertaken in a way that is unpredictable by either the remote device 10 or the server 12.

Where the server 12 requires verification of the integrity of the remote process, it proceeds to step 380 wherein it requests bound input data from the database 36 at the remote device 12. Upon receive such a request for bound input data, remote device 10 may undertake the optional step 385 of notifying the user that is has received an enforcement request requiring data be sent to the server 12. Such a notification can include reference of the data, and the reason for the invoked enforcement request.

In response to the bound input data request, bound input data is sent to the server 12 in step 390 (and preferably after the user acknowledges the request).

Upon receipt of this bound input data, the server 12 first verifies that this input data is indeed bound to the submitted output data by verifying the signature of the binding data, and next verifying the binding data itself (step 400). The verification of the signature of the binding data can be done systematically and immediately after reception of this binding data.

If the signature and binding is correct, the server 12 verifies the integrity of the remote process by carrying out the same process internally using the bound input data as input, and by comparing the output with the one submitted by the remote host (step 410). In other words, the sever 12 mirrors the remote process to check whether or not the results match. If the results don't match, then there is evidence of tampering of the remote process.

If all verification steps have passed, the verification phase stops and the server proceeds to step 370 as in the standard case. Otherwise, the server proceed to step 420 in which is notifies the relevant part of the system that an error has been detected, which can potentially be interpreted as an attempt of fraud.

From the above description, it will be understood that embodiments are valid for many applications, and in particular:

(1) A system made of a server and a remote device comprising communication means and a host controller onto which a process is running and the integrity of which must be proved to the system. The server and remote devices may undertake the method as described and illustrated with reference to FIG. 3.

(2) A system such as (1) but wherein the remote device also includes a lightweight secure controller (such as found typically found in a smartcard), which implements the security sensitive part of the commit phase, ie. either the input & output binding process or the binding data signature process, or both.

(3) A system such as (1) or (2) but applied to the field of telematics, wherein the remote device is used as an OBU of a vehicle and also includes a global navigation system receiver, and wherein the communication means are based on or use mobile technology such as GSM, SMS, GPRS, UMTS, or 4G for example.

(4) A system such as (3) where the input data is the GNSS data issued by the GNSS receiver, or are input data derived therefrom.

(5) A system such as (4) wherein the output data is the cost to be paid for a given trip.

(6) A system made of a server and a remote device, and where the remote device is split into two main components: a first main component such as the remote device described in (5); and an additional component made of at a least a computationally powerful controller; and wherein thin client processes and enforcement process are executed in the main component, and fat client processes are executed in the additional component.

As an example application, an embodiment can be applied to an Advanced Technologies and Oceanic Procedures (ATOP) system, as covered by the point (6) above.

Figure 4:
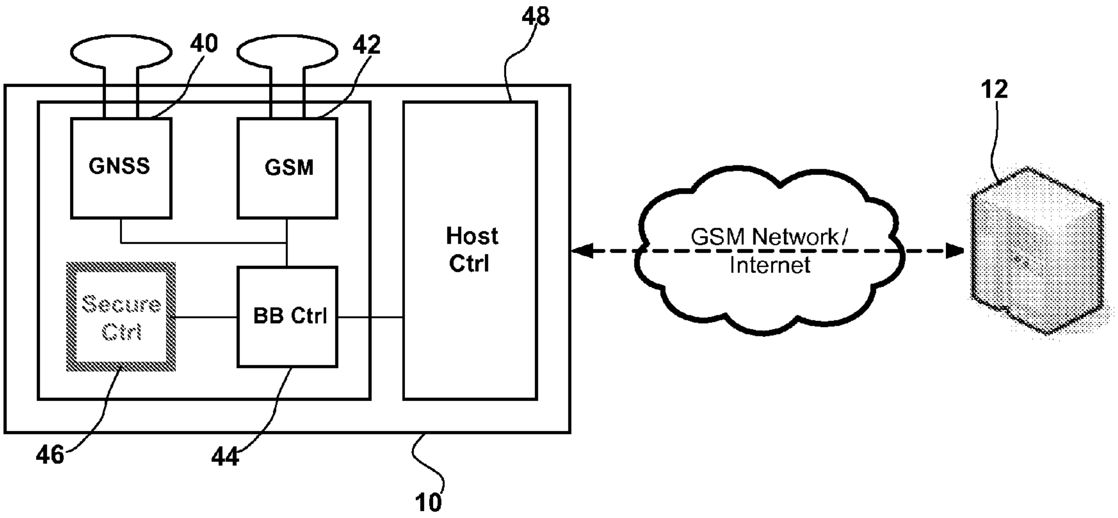
FIG. 4 is a schematic diagram of an Advanced Technologies and Oceanic Procedures (ATOP) system according to an embodiment of the invention.

Referring to FIG. 4, an ATOP system is a System-in-package component that contains mainly a GPS front-end 40, a 2.5G mobile modem 42, a baseband controller 44 and a very secure tamper-resistant controller 46 similar to those found in smartcards such as Smart MX for example. The primary application target for the ATOP in Telematics is the implementation of a "thin client OBU. The ATOP supports all the security mechanisms required to secure such a thin client OBU. However, it is also possible to use the ATOP system to implement a "Fat" or "SuperFat" client OBU by connecting the ATOP to a more powerful controller that will run the computation intensive steps of map matching and cost computation. An advantage of the invention is that this extra controller doesn't need to be secure, and so that any general purpose controller can be selected, hence reducing the cost of the SuperFat OBU. Also the secure controller contained in the ATOP can easily run the security-sensitive steps described in the invention, thereby enabling a highly secure implementation at a very attractive cost.

To aid understanding, in a thin client of a road tolling system, the OBU receives GPS data and map matching and trip cost computation steps are performed by an external server. In a fat client scenario, the OBU undertakes additional processing steps to perform map matching. In a superfat scenario, the OBU undertakes all of the processing of a fat client OBU, but also undertakes the additional processing of trip cost computation, before transmitting the resulting trip cost to the road tolling back-end server.

Figure 5:
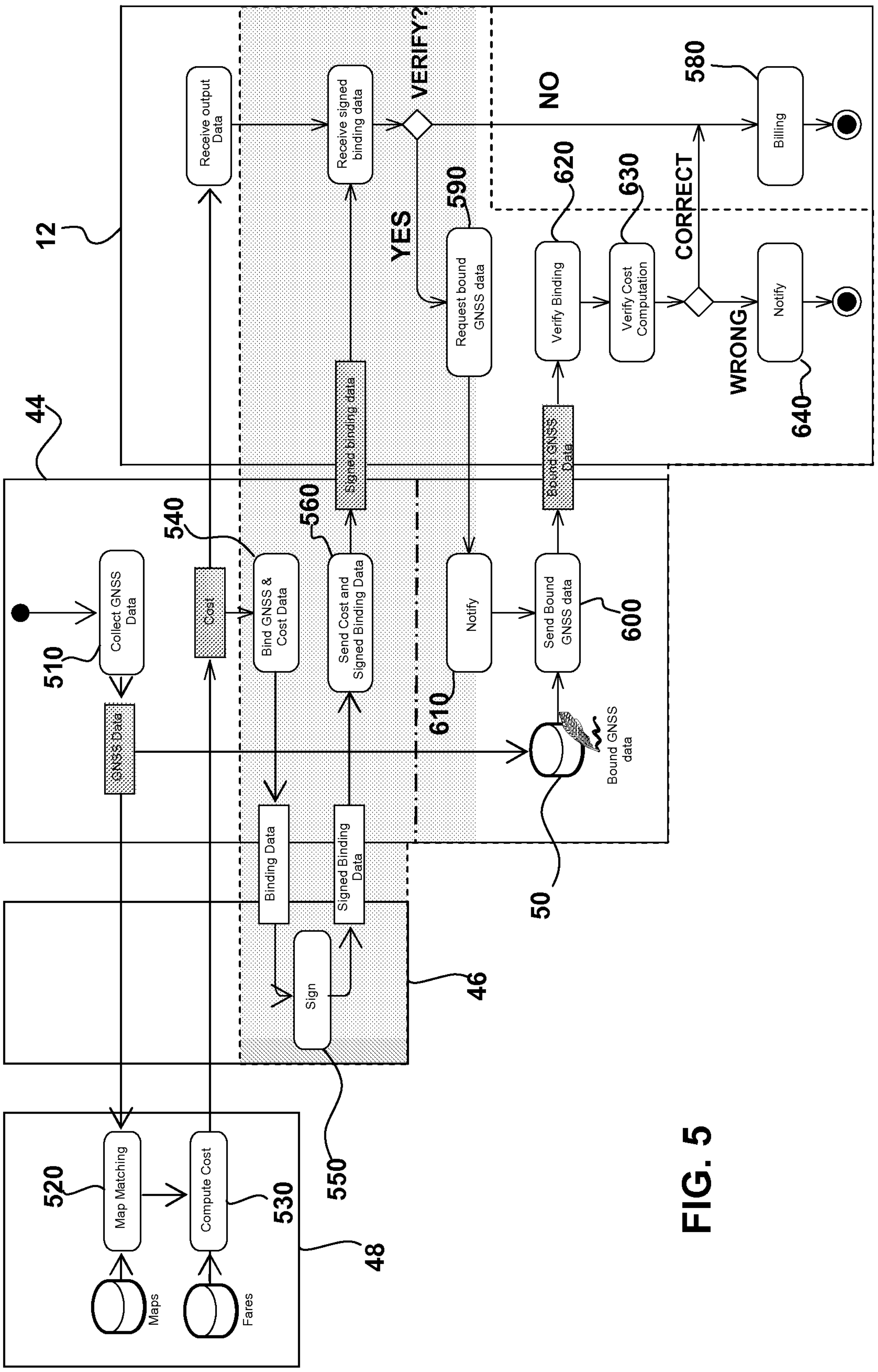
FIG. 5 is a flow diagram illustrating a general transaction in the system of FIG. 4 according to an embodiment of the invention.

Referring now to FIG. 5, a process flow of a secure SuperFat client implementing an embodiment of the invention is shown.

In the FIG. 5, the ATOP is the main sequencer of the OBU. The ATOP collects the GPS data at regular intervals and stores this data in an internal storage, after packaging and optional compression (step 510). By way of example, packaging of the data can be undertaken based on factors such as the distance driven, time elapsed, and/or start of a new trip, etc. Cost will be computed for each package and sent to the host individually.

The GPS data are sent to the external controller 48, either in real-time or deferred, where Map Matching (step 520) and Cost Computation (step 530) process are executed to derive a cost Ci corresponding to a given GPS data package. On completion, the ATOP will take the source GPS data, Gi, for given package i, and process them together to generate the binding data Bi as described in equations 1 and 2:

$$Hi \leftarrow HASH(Gi) \tag{1}$$

$$Bi \leftarrow i|Ci|Hi, \tag{2}$$

where HASH is a cryptographically secure one-way hash function such as defined in the state-of-the-art (for example, a suitable candidate is the standard SHA-256, soon to be replaced in the coming years by NIST after completion of their open competition for new hash function standard).

Due to the one-way nature of the hash function, it is not possible to infer from Bi any information relative to Gi, hence preserving the privacy of the driver. In step 540, the binding data is then sent to the ATOP secure controller 46 for signing (step 550) according to equation 3:

$$Si \leftarrow EC\text{-}DSA\text{-}SIGN\{SK_{ATOP}\}(Bi) \tag{3}$$

In this case, the well-known signature algorithm DSA is used along with an elliptic curve private key $SK_{ATOP}$. Any other similar or suitable algorithm can be used.

As a last step, step 560, the binding information, which includes the package identifier i, the computed cost Ci, and GPS data hash, and the signature Si is sent to the remote Road-Pricing server 12.

On reception (step 570), the server 12 verifies the integrity of the transmitted data by verifying the validity of the signature, using ATOP public key PKATOP according to equation 4:

$$Correct/Incorrect \leftarrow EC\text{-}DSA\text{-}VERIFY\{PKATOP\}(Si, Bi) \tag{4}$$

On a random basis, the server 12 will also transmit a request for cost to the ATOP baseband controller 44 to prove the correctness of the computed cost according to equation 5:

$$No\ Request/Enforcement\ Request \leftarrow RANDOM(\,) > threshold \tag{5}$$, where RANDOM( ) is a secure random generator generating a value between 0 and 1, and threshold is a pre-defined threshold value that is defined by the Road-Pricing Operator after taking into account various factors including the wanted frequency of controls, the cost of transmission, the impact on privacy, the extra workload at server side, for example.

There are three possible outcomes:

1) the signature integrity is incorrect—This is notified to the transmitting ATOP, which can then, for instance request that the information be resent to the server. If the signature fails a second time, a fraud manager can be notified for further investigation.
2) The signature is correct, and no enforcement request triggered—In this case, the server 12 replies to the ATOP with an acknowledgement message, and execution continues normally to the billing process (step 580).
3) The signature is correct, and an enforcement request is triggered—In this case, the server 12 replies to the ATOP baseband controller 44 by transmitting a request for bound GPS data corresponding to the package i (step 590).

The ATOP baseband controller 44 looks up the requested GPS data package in its database 50 and transmits the requested information back to the server 12 (step 600). Prior to step 600, the ATOP baseband controller 44 can notify the user (i.e. the driver of a vehicle carrying the OBU of this embodiment) that an enforcement request is on-going (step 610), and that supplementary information must be transmitted to comply with the request. This can be a simple notification message on an alphanumeric display, giving for instance the date and time of the trip to transmit, or a graphical display on a map of the actual trip information that must be transmitted. It may be preferable to arrange that the driver must press on a button to give his consent before information can be transmitted back to the server in response to the enforcement request.

On reception of the bound data, the server 12 will hash the GPS data Gi and compare the result with the transmitted hash contained in the binding data that has been transmitted previously according to equation 6:

$$\text{Correct/Incorrect} \leftarrow Hi \overset{?}{=} \text{HASH}(Gi) \quad (6)$$

If this verification process in step 620 is passed, the RP Server will then compute the cost corresponding to the transmitted trip data Gi, and compare the result with the cost Ci previously transmitted, as detailed in equation 7:

$$\text{Correct/Incorrect} \leftarrow Ci \overset{?}{=} \text{COMPUTE-COST}(Gi) \quad (7)$$

If this verification process is passed, the method proceeds normally to the billing process of step 580. On the other hand, if the verification fails in either of the comparisons made above according to equations 6 and 7, the server 12 notifies the ATOP in step 640, which can take appropriate action (for example, retry the data transmission, display a message to the driver, etc.). On successive failure, the server 12 notifies a fraud manager for further investigation.

It is noted that the embodiment described above with reference to FIG. 5 only includes verification of processes performed in the external controller 48. It does not guarantee the integrity of data submitted to the external controller (for example, GPS data). It is assumed that the integrity of such input data is protected by other security mechanisms independent of the current invention.

The invention has been described in connection with single frequency GPS, but other GNSS systems (GLONASS, Galileo etc) would be similar. Indeed the techniques could also be applied to multiple frequency systems, with appropriate means of capturing the IF data from each carrier.

Various additional features and modifications will be apparent to those skilled in the art.

The invention claimed is:

1. A system comprising a server and a remote device and configured to implement a secure transaction of data between the server and remote device, wherein the remote device comprises:

a processing device configured to process input data according to a security process;

a data storage device configured to store verification information derived from the input data;

a communication device configured to communicate the input data which has been processed by the security process to the server, wherein the server is configured to transmit a verification request to the remote device, verify integrity of the security process based on the stored verification information received from the data storage device in response to the verification request; and a secure processor, wherein the verification information is derived from the input data according to an encryption algorithm implemented by the secure processor, wherein the remote device is configured to communicate verification information to the server only in response to receiving a verification request from the server.

2. The system according to claim 1, wherein the remote device is a vehicle mounted unit comprising a global navigation system receiver configured to implement a position tracking function, and wherein the communication device comprises a mobile telephony receiver.

3. The system according to claim 2, wherein the input data is derived from data output from the global navigation system receiver.

4. The system according to claim 1, wherein the security process is configured to process input data such that the processed data does not disclose information related to the content of the input data.

5. The system according to claim 4, wherein the security process is a cryptographically secure one-way hash function.

6. The system according to claim 1, wherein the server is configured to process verification information received from the remote device according to a supplementary security process so as to verify the integrity of the security process undertaken by the remote device.

7. The system of claim 1, further comprising:

a database, local to the remote device, that is configured to store the verification information.

8. A method of implementing a secure transaction of data between a server and a remote device, the method comprising:

processing input data, in the remote device, according to a security process;

storing verification information derived from the input data;

communicating the processed input data to the server;

transmitting a verification request from the server to the remote device;

communicating, from the remote device, the stored verification information to the server in response to the verification request;

verifying, at the server, integrity of the security process based on the verification information communicated to the server; and deriving the verification information from the input data according to an encryption algorithm implemented by a secure processor, wherein the remote device is configured to communicate verification information to the server only in response to receiving a verification request from the server.

9. The method as claimed in claim 8, wherein the remote device is a vehicle mounted unit comprising a global navigation system receiver configured to implement a position tracking function, and wherein the step of communicating is implemented using a mobile telephony receiver.

10. The method as claimed in claim 9, further comprising:

deriving the input data from data output from the global navigation system receiver.

11. The method as claimed in claim 8, wherein the step of processing input data comprises:

processing input data such that the processed data does not disclose information related to the content of the input data.

12. The method as claimed in claim 11, wherein the step of processing input data comprises:

processing input data using a cryptographically secure one-way hash function.

13. The method as claimed in claim 8, wherein the step of verifying comprises:

processing verification information received from the remote device according to a supplementary security process.

14. The method of claim 8, further comprising:

storing the verification information in a database which is local to the remote device.

15. The method of claim 8, further comprising:

notifying a user that the remote device has received an enforcement request requiring data to be sent to the server.

16. The method of claim 8, wherein verifying, at the server, further comprises:

verifying a signature of binding data; and subsequently verifying the binding data.

17. The method of claim 8, further comprising:

communicating, to the server, a package identifier, computed cost, GPS data hash, and a signature.

18. A non-transitory medium readable by a machine, the non-transitory medium comprising:

instructions for processing input data, in a remote device, according to a security process;

instructions for storing verification information derived from the input data;

instructions for communicating the processed input data to the server;

instructions for transmitting a verification request from the server to the remote device;

instructions for communicating the stored verification information from the remote device to the server in response to the verification request;

instructions for verifying, at the server, integrity of the security process based on the verification information communicated to the server; and instructions for deriving the verification information from the input data according to an encryption algorithm implemented by a secure processor, wherein the remote device is configured to communicate verification information to the server only in response to receiving a verification request from the server.

* * * * *